United States Patent
Bannach Sichtermann et al.

[11] Patent Number: 5,334,317
[45] Date of Patent: Aug. 2, 1994

[54] METHOD FOR RECOVERING ORGANIC MATERIAL IN SOLVENT EXTRACTION PROCESSES

[75] Inventors: Gustavo H. Bannach Sichtermann, Santiago; Aliro T. N. Pincheira Alverez, Chuquicamata; Andres A. Reghezza Inzunza, Chuquicamata; Alberto S. Cruz Rivera, Chuquicamata; Tomas S. Lorca Soto, Antofagasta; Luis F. Hidalgo Cortes, Chuquicamata; Jorge M. Menacho Llana; Miguel A. Martinez Pereira, both of Santiago, all of Chile

[73] Assignee: Corporacion Nacional Del Cobre De Chile, Santiago, Chile

[21] Appl. No.: 99,038

[22] Filed: Jul. 28, 1993

[30] Foreign Application Priority Data

Aug. 4, 1992 [CL] Chile .................................. 816-92

[51] Int. Cl.$^5$ ............................................ B01D 17/04
[52] U.S. Cl. ........................................ 210/708; 210/634; 210/712; 210/738; 210/800; 210/803; 210/805
[58] Field of Search .............. 210/634, 708, 712, 772, 210/738, 800, 803, 805

[56] References Cited

U.S. PATENT DOCUMENTS

| | | | |
|---|---|---|---|
| 4,231,866 | 11/1980 | Moser et al. | 210/708 |
| 4,765,910 | 8/1988 | Wolf | 210/708 |
| 4,839,054 | 6/1989 | Ruebush et al. | 210/708 |
| 4,959,160 | 9/1990 | Lake | 210/708 |
| 5,149,440 | 9/1992 | Moller | 210/708 |
| 5,186,817 | 2/1993 | Paspek et al. | 210/708 |

*Primary Examiner*—Neil McCarthy
*Attorney, Agent, or Firm*—Pennie & Edmonds

[57] ABSTRACT

A method for the recovery of organic materials trapped in the emulsions generated in solvent extraction plants. The emulsions are first washed in aqueous solution. The washed emulsions are then subjected to a mechanical breaking process in aqueous/organic dispersion, inducing the inversion of the continuity of phases in the emulsions and the release of the phases involved. Subsequent separation of the phases by decanting enables the removal of significant quantities of solids and increases the overall recovery of the organic trapped in the emulsions.

23 Claims, 2 Drawing Sheets

METHOD FOR RECOVERING ORGANIC MATERIAL IN SOLVENT EXTRACTION PROCESSES

The present invention relates generally to the field of solvent extraction and, more particularly, to a method for recovering organic material in solvent extraction processes.

BACKGROUND OF THE INVENTION

In industrial solvent extraction processes, a viscous material often accumulates in liquid phase decanting ponds. This material is a close mixture of organic and aqueous solutions together with extremely fine solid particles which can be either organic or inorganic in nature. In some cases, the mixture also contains air distributed as a fine dispersion of bubbles.

The above-described mixture is present as an emulsified system of small drops of organic material suspended in an aqueous matrix, with the solid particles at the organic/aqueous interphase. Extraction plant operators commonly refer to these materials as "crud" "gunk" "grungies" "lumps" or "lees" (hereinafter collectively referred to as "crud" or "emulsions") and try to minimize their occurrence since their presence can alter the behavior of the system during phase separation. In particular, these emulsions can affect dispersion band widths in decanters, the stability of phase dispersion in mixers, and the quantity of the residue of one liquid phase, i.e., present as micro-drops, found in the other liquid phase.

In practice, these emulsions result in losses of expensive organic reagent as well as in contamination of the electrowinning electrolyte or other subsequent process. The contamination may be due to the presence of micro-drop residues of the original or degraded organic, or residues in the advance solution at a subsequent stage (e.g., residues of organic in aqueous, i.e., "O/A"). Contamination can also be due to an aqueous solution from leeching circuit which is transferred to the electrolyte by way of the organic phase as residues of aqueous in organic ("A/O"). The presence of such impurities in the electrowinning electrolyte can deteriorate cathodic quality, contribute to increased corrosion of anodes, and decrease the current efficiency of the electrolytic process, thus consequently increasing operating costs. In some instances, moreover, these residues can compromise the quality of the final product.

Crud is produced due to the emulsifying action exerted by fine and colloidal solids contained in aqueous solutions that circulate through the extraction circuit. For the most part, these solids are hydrophilic and thus are located in the organic/aqueous interphase under conditions of reduced free interfacial energy which occur when the surface of the solids exposed to the organic phases is minimal. The steric configuration of the particles curves the convex interphase toward the organic solution, inducing the formation of small drops of organic in a continuous aqueous medium, thus giving rise to crud formation.

Accordingly, if it were possible to eliminate the fine solids from the aqueous solutions used in solvent extraction processes, the emulsions known as "crud" would not form in the decanters. In practice, however, it is unlikely that the solids can be completely eliminated. Fine particles enter the system suspended in strong solutions when the solids have been collected by the natural passage of leeching material through material mineralized in pile leeching, dumps, washing troughs or other types of beds. Further, fine particles may also exist as part of the matrix in the form of clays or other alteration products of the host rock, or may form by the action of the leeching agent, as occurs with colloidal silica generated by chemical dissolution of silicates. These solids may also be drawn from the conduits and storage areas for the leething solutions, particularly during very rainy periods. Such solids additionally result from an incomplete solid/liquid separation in agitated leeching processes. Solids can also be produced by post-precipitation of hydrolyzable species or solid products of anode corrosion, environmental dust, fungus, or even bacteria.

Due to the innumerable ways that hydrophilic fine particles can be introduced into an extraction system, therefore, formation of crud always occurs to some extent. It is therefore necessary to remove the crud from the decanters, which removal thus constitutes a normal periodic operating step. One method for removing such crud is to decant the emulsion for prolonged periods, after which a portion of the trapped organic can be recovered since emulsions are thermodynamically unstable systems and thus their coalescence is simply a matter of kinetics. Having a portion of the inventory of organic material outside the circuit, however, can significantly add to the financial costs associated with the extraction process. Thus, it is often necessary to perform additional process steps to recover the organic material contained in the emulsions.

A common method for breaking such emulsions, particularly in the field of copper technology, comprises centrifuging the emulsions using high-cost continuous centrifugation units. The capacity and operational efficiency of such centrifuges are reduced, however, by their limited availability as well as high cleanliness and maintenance requirements. Thus, although many extraction plants have centrifuges, they are seldom used.

An alternative process used in some plants comprises spreading water vapor over the surface of emulsions contained in a storage pond until the temperature of the system is raised between 43° and 49° C. This enhances the coalescence of the system, making it possible for a centrifuge to deal with a smaller quantity of the emulsions. However, this method generates compacted emulsions that, compared to the original, i.e., "primary" emulsions, can be significantly more difficult to break. In addition, local overheating due to insufficient temperature control can induce catalytic degradation of the extractant.

In other instances, e.g., where the emulsions accumulate in a re-extraction stage, which is a frequent situation in certain plants, the emulsions are periodically pumped to the discharge point of a mixer used in the last stage of extraction, entering underneath the dispersion band into the decanter, where they coalesce. This technique has very limited application, however, since it is only effective when the emulsions have very low stability. Moreover, the remaining emulsions act as emulsifying agents and can invert the continuous phases in those mixers that operate in continuous organic. This process can also increase losses of organic in the aqueous phase exiting the circuit.

Another process of practical interest is the mechanical breaking of emulsions as described, for example, in Chilean Patent No. 30,817. This method comprises withdrawing the emulsions from continuous decanters and emptying them into an agitation pond; adding a volume of an organic phase to the emulsions which is miscible with the organic part of the emulsions and immiscible with its aqueous part; agitating the phases so that during the mixing, the continuous phase is the organic phase; decanting the organic phase and reintegrating it into the extraction circuit. This process is efficient in many cases. However, even after the emulsions are broken, residual or secondary emulsions remain which may contain between 15 and 20% of the original organic material. These residual or secondary emulsions are normally sent to a drainage pond where a portion of the remaining organic is recovered by simple decanting over a prolonged period. As an alternative, if a centrifuge is available, the secondary emulsions can be treated thereby as described above.

SUMMARY OF THE INVENTION

An object of the present invention is to provide an improved method for mechanically breaking the emulsions described above, which, without requiring special equipment such as centrifuges or the like or prolonged decanting periods, makes it possible to achieve recoveries of organic material that are comparable to or greater than those of the known alternatives discussed above. Important advantages of the process of the present invention are its simplicity and low investment and operating costs. Other objects and advantages of the invention will become apparent to those skilled in the art through the detailed description of the method and the specific examples as set forth below.

In accordance with the present invention, the crud, i.e., comprising organic/aqueous emulsions is transferred to a first collecting pond wherein it is washed with an aqueous solution. The washed crud is thereafter purged (i.e., by evacuating a portion thereof from the pond) to remove a portion of the aqueous solution and solids in suspension contained therein. The washing stage removes a portion of the solid particles by generating emulsions with stability comparable to that of the original or primary emulsions. The system is balanced in such a way that the organic losses essentially correspond to the impregnation in the solids drawn off in the washing solutions, which generally do not exceed 10% of the organic of the original emulsions, and are typically in the range of 3 to 5% in volume of the total organic.

The remaining washed crud is thereafter transferred to a second collecting pond wherein it is subjected to mechanical agitation with a given volume of an organic phase miscible with the organic phase of the emulsion and immiscible with aqueous phase thereof. The effect of this agitation is to mechanically break the emulsion by inverting the continuous phase such that the organic phases are separated from the aqueous solution with the dispersed solids, which, however, retain a minimal fraction of impregnated organic material.

Thereafter, the emulsion is decanted for between 15–24 hours to permit formation of several discrete liquid layers within the second pond, namely a coalesced aqueous phase layer, a layer of secondary emulsions and a layer of organic material, which organic layer is thereafter removed from the collecting pond. In practice the emulsions may be washed in a semi-batch mode in a closed circuit with the mechanical breaking stage.

A further embodiment of the invention includes an additional washing treatment stage for removing a further portion of the organic material by washing the solids obtained in the mechanical breaking stage with a solvent used in the extraction plant. This process is particularly useful in situations wherein the solids contain some valuable material which it may be desirable to recover. Alternately, in another embodiment of the invention, solids impregnated with organic material are stored in a collecting pond for spills or drainage to provide for the additional recovery of organic which is naturally decanted.

The methods described above result in recoveries of the organic material that are greater than those achieved with known techniques, without the need for special equipment, such as a centrifuge.

DETAILED DESCRIPTION OF THE INVENTION

Figure 1:
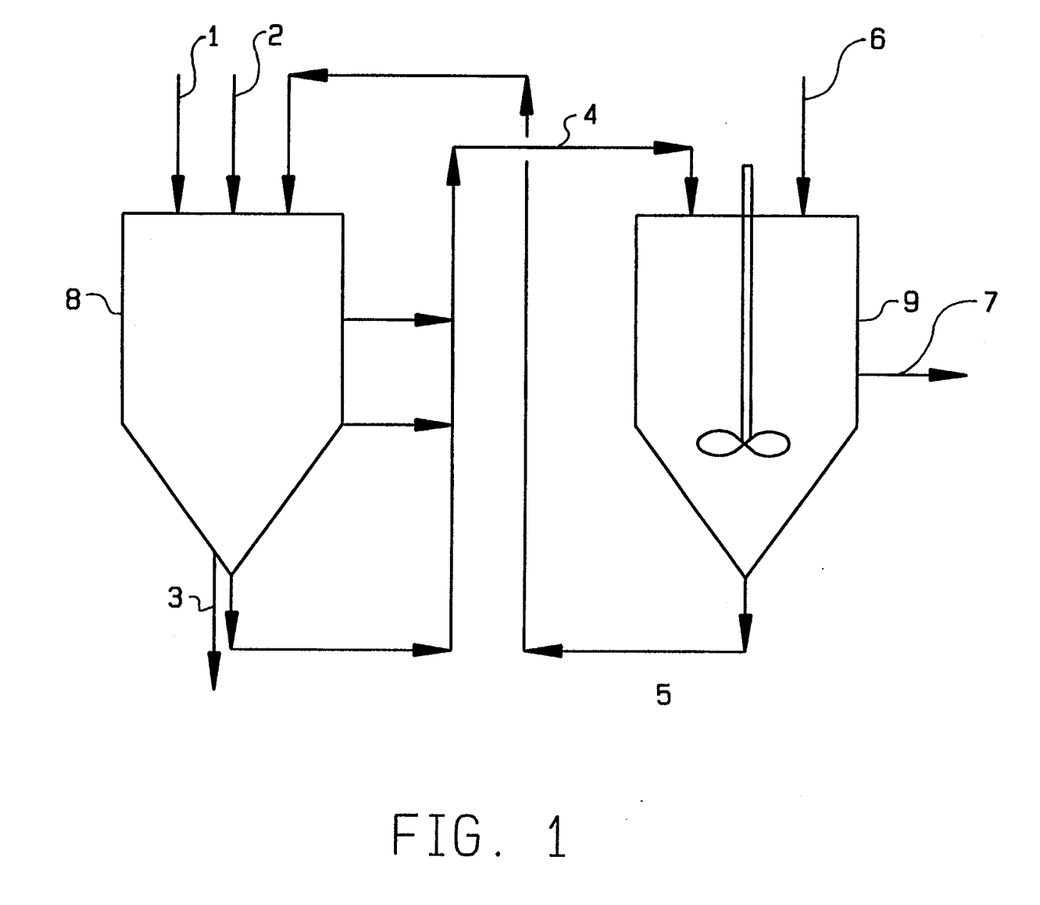
FIG. 1 is a flow chart illustrating a first embodiment of the method of the invention.

The process illustrated in FIG. 1 comprises emptying a predetermined amount of primary emulsions or crud 1, generated during a solvent extraction process into a first collecting or washing pond 8. An aqueous washing solution 2, which may be preheated to decompact (i.e., reduce the density of) the emulsions, is then added to pond 8.

Any suitable solution from the extraction plant can be used as a washing solution. For example, a spent electrolyte having high levels of copper and acid (36 gms/l and 170 gms/l, respectively) or an advance electrolyte having high levels of copper and acid (55 gms/l and 170 gms/l, respectively) may be used. One may also use for the purpose a material selected from among the following: pregnant leach solution ("PLS") which exhibits variable levels of copper and which has a pH in the range of 1.5–2.2, refining solutions such as raffinate solutions ("rafinate") with low levels of copper and sulfuric acid levels of approximately 17 gms/l, acidulated water, i.e., a term describing industrial water with variable levels of sulfuric acid, and fresh water. Preferably, raffinate refining solutions are used due to their availability and low comparative cost. The amount of washing solution added to pond 8 is preferably such that the emulsion-aqueous ratio is in the range of 1:1 to 1:2.

As those skilled in the art will appreciate, the size of washing pond 8 may be varied in accordance with the amount of emulsions to be treated. In washing ponds with a capacity of about 40 $m^3$, approximately 15 $m^3$ of emulsions may be processed in the washing stage. The pond preferably has a conical base to facilitate withdrawal of various fractions as described below.

The washing solution is typically added as a spray or shower over the surface of the emulsions 1. The solution 2 may be sprayed using a hose or other appropriate device, such as perforated pipes uniformly distributed over the surface of collecting pond 8. The flow velocity of the washing solution is selected so that it does not generate a high degree of agitation in the emulsions, as additional emulsification may occur if intense agitation is produced. Flow rates in the range of 100 liters/minute to 2 $m^3$/minute are preferred.

When contact between the emulsions 1 and the washing solution 2 is poor, a flow of air can be introduced through air supply means located in the lower portion of pond 8 to effect gentle contact between the phases. Preferably, the air is supplied by pipes located at the bottom of pond 8, although other suitable air supply means may also be used. The volume of air flow should be sufficient to generate a slight degree of agitation in the emulsion-washing solution mixture, so as to increasingly transfer solids from the emulsion to the aqueous phase. Suitable air flow rates have been found to be in the range of 1 to 40 liters/minute.

Alternatively, a low frequency vibration device, a mechanical agitator, such as an impeller, or recirculation of the fluid with a positive displacement pump may also be used to effect contact between the aqueous solution and the emulsions. It is important to keep in mind, however, that no matter which contact system is chosen, an excessive flow velocity can induce emulsification.

The duration of the washing stage essentially corresponds to the time during which the aqueous solution 2 is charged, i.e., introduced, into washing pond 8. The washing time is affected by the velocity of addition of the washing solution and thus, the more rapidly the washing solution is added, the shorter the washing time. In practice, the washing time will typically vary between about 1 to 2 hours.

After the washing operation is completed, pond 8 is purged through a valve in its lower surface to remove (1) a large portion of the aqueous washing solution, (2) solids in suspension impregnated with organic 3, and (3) a small fraction of organic (in the form of micro-drops). To minimize the fraction of organic removed, purging should be stopped as soon as the aqueous solution begins to take on the typical color of the organic phase.

As will be appreciated, the amount of aqueous solution and solids in suspension removed as described above may vary. Typically, the amount of aqueous solution removed is slightly less than the amount which was introduced into the washing pond, thus removing an amount of solids that can vary between 25 and 75% of the solids contained in the initial emulsions. Alternatively, a system of communicating vessels may be established such that as the emulsions are washed, the washing solution is discharged in a continuous manner.

The washing pond and its remaining, i.e., unpurged, contents are then permitted to rest undisturbed to permit separation of the phases. The rest period typically varies between 2 to 24 hours and is preferably between about 15 to 24 hours. The duration of rest period is affected by the density and viscosity of the phases involved, as well as the temperature, particle size, expected levels of recovery, and the levels of solids remaining in the recovered organic. The greater the separation time for the phases, the greater the recovery of organic, and the lower the content of solids in suspension in the recovered organic.

Thereafter, a second purge of aqueous and solids in suspension is carried out to minimize the content of aqueous solution and solids in suspension in the washed emulsions to values between 30 and 50 percent by volume and between 1 and 5 percent by volume, respectively. Of course, the exact quantities of aqueous solution and solids purged are variable and depend upon the decanting time. Again, the aqueous and solids are purged until the typical opalescence of the organic material, which is finely dispersed in the aqueous, can be seen.

The washed emulsions 4 remaining in pond 8 are then slowly transferred into a second collecting, i.e., or agitation pond 9. Emulsions 4 are preferably moved from washing pond 8 through a lateral valve located a few centimeters above the bottom of the pond to ensure that less compacted (i.e., less dense) emulsions (i.e., crud which is lighter and thus located in the upper area of the pond) are removed for mechanical breaking, while the layer of emulsions with higher density (i.e., more compacted) remain in the washing pond, as is shown in FIG. 1. In this manner, these emulsions have a greater residence time in pond 8 and therefore they release a greater proportion of aqueous phase, which translates into an increased probability of breaking up the emulsions. The transfer of the washed emulsions from pond 8 to agitation pond 9 in which mechanical breaking occurs typically takes about 1 hour, depending upon the pumping capacity of the system.

Agitation pond 9 also preferably has a conical base and its size may vary with each particular application depending upon the amount of emulsions to be treated. Pond 9 contains a supply of an organic liquid liquid 6 (referred to herein as "operating organic") such that the organic-emulsion volume ratio is preferably between 1:3 and 1:5. Of course, the amount of the organic liquid introduced into pond 9 will depend upon the pumping capacity of the facility. The organic liquid 6 is miscible with the organic phase of the emulsions and immiscible with their aqueous phase.

Agitation pond 9 is equipped with an impeller which is preferably located above the bottom surface thereof at a height of approximately one-third the height of pond 9. A preferred impeller has three arms, revolving at a tangential velocity typically between 500 and 1,300 feet/minute. The efficiency of recovery of organic by mechanical breaking is typically maximized at tangential velocities of between 850 and 950 feet/minute.

Once the batch (i.e., the operating organic and washed emulsions) is directed into pond 9, it is mixed by the impeller for between 15 and 120 minutes, most preferably for approximately 1 hour. The organic phase is mechanically agitated such that, during mixing, the continuous phase is organic. Then the agitation is stopped and the batch is allowed to decant for a period that can range from 15 to 24 hours. This decanting period is affected by factors including the density and viscosity of the phases involved, the temperature (i.e., higher temperatures favor the process), particle size, degree of previous agitation, drop size, and interfacial tensions. During this period, a new batch of primary emulsions can be washed in the washing pond 8.

At the end of the decanting period, an aqueous phase with solids in suspension develops at the bottom of the agitation pond. A layer of unbroken, i.e., "secondary" emulsions, is located above the aqueous, and a layer of total organic is located above the secondary emulsions. The aqueous layer is removed from the agitation pond through a valve in the lower portion of the pond and can be sent to a drainage pond or integrated into a line of refining solution. The solids in the aqueous solution retain very small quantities of trapped organic which can subsequently be recovered if desired. The organic 7 recovered from the pond 9 can be extracted through an upper lateral valve and sent to the extraction plant. The valve is located at a height such that, when the aqueous with solids, secondary emulsions, and organic layers have been removed, a level of organic remains in the pond which is suitable to repeat the mechanical breaking process on the next batch of emulsions.

The "secondary" emulsions 5 are extracted under suction through the base of pond 9 using a pneumatic pump and then introduced into the washing pond 8 through submerged piping. Alternately, the secondary emulsions may also be extracted through a lateral valve. The secondary emulsions are introduced into the upper part of washing pond 8, on top of any emulsions accumulated therein. The secondary emulsions may also be added into the bottom of the washing pond through a submerged pipe if minimum agitation between the accumulated and secondary emulsions is desired.

Figure 2:
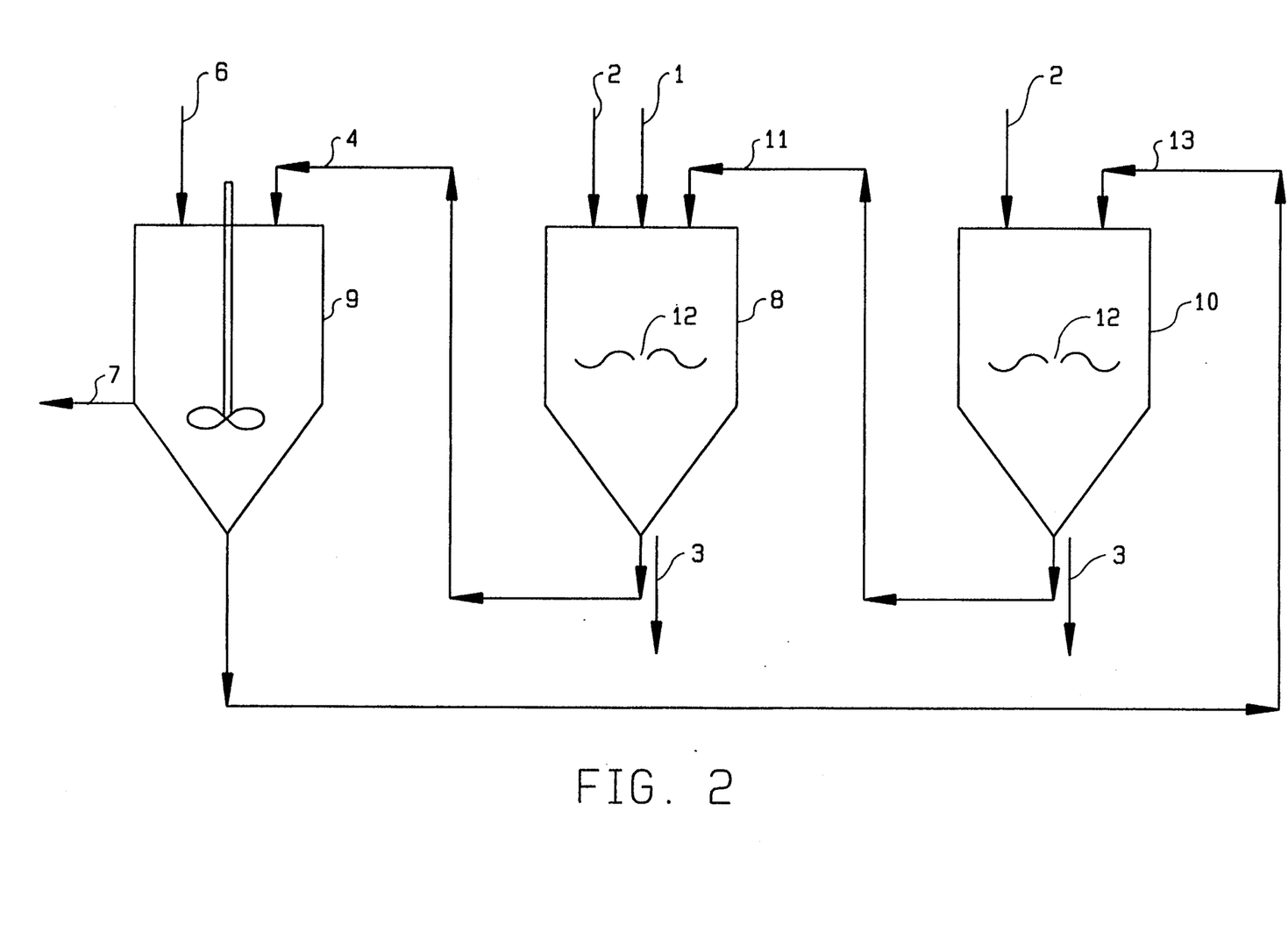
FIG. 2 is a flow chart illustrating a further embodiment of the method of the invention.

In another embodiment of the process of the invention, as shown in FIG. 2, a third collecting pond 10 is utilized to store emulsions that have been conditioned prior to going on to the mechanical breaking stage. Again, the base of the third pond 10 is preferably conical and the size of the pond will vary in accordance with the amount of emulsions to be treated at an individual plant. These emulsions may comprise secondary, decompacted or fresh primary emulsions 1 and decompacted secondary emulsions 11, or other emulsions that are considered suitable for introducing into the mechanical breaking pond 9.

The use of a third washing pond 10 for secondary emulsions prevents unwashed secondary emulsions 13 from being emptied out at any given moment into the same pond 8 that contains washed secondary emulsions 11. The high viscosity that characterizes both types of emulsions ensures a minimal degree of mixing. Thus it is still possible to extract the washed emulsions through a valve located in an intermediate zone, as has been indicated in FIG. 1.

The organic material recovered from the emulsions 7 typically contains between 200 to 1,500 ppm of solids in suspension. In practice these levels do not imply a significant contribution of solid particles entering into the extraction plant in comparison to that contributed by leeching solutions, which normally contain more than 90% of the solids in suspension. However, a rest period of approximately 48 hours in many cases makes it possible to bring the concentration of the previously mentioned solids-down to a lower level. In addition, washing the organic with an aqueous solution dispersed as a spray or a shower, sprinkling with a hose, or other method of washing, contributes to significantly lower levels of solids in suspension in the recovery organic 7 before returning it to the extraction plant.

EXAMPLES

The embodiments described herein and the specific examples of the present invention provided below are presented only for purposes of illustrating the principles of the present invention. Accordingly, the present invention is not to be limited to the exact configuration, examples, and steps as illustrated and set forth below:

EXAMPLE 1

Mechanical Breaking of Emulsions Conducted on a Laboratory Scale

A sample of emulsions was obtained from a copper extraction plant which treats solutions of sulfuric leeching of fresh and altered ores of silicate gangue, the main copper-bearing varieties of which are crisocola, copper pitch, copper wad, and atacamite.

The emulsions were allowed to decant for 2 hours. At the end of this time period, the coalesced organic and aqueous phases were removed. The remaining material was maintained in a homogenized state in order to perform the following tests for recovering the organic trapped in the emulsions:

1(a)—Mechanical breaking of the primary emulsions and centrifuging of the remaining or secondary emulsions (reference test);

1(b)—Mechanical breaking of the primary emulsions and subsequent washing of the secondary emulsions agitated mechanically;

1(c)—Washing of the primary and secondary emulsions with mechanical agitation and mechanical breaking.

The processes and the results obtained in each case are described in detail below.

Test 1(a)

Mechanical Breaking of the Primary Emulsions and Centrifuging of the Remaining, i.e., Secondary Emulsions (reference test)

The tests were conducted in a cylindrical conical pond having a 4-liter capacity with a diameter of 0.15 meters and equipped with an agitator having 3 blades with a diameter of 0.075 meters. The process involved loading a volume of operating organic from the plant (Acorga mix PT-5050 of ICI, 984 Henkel leeching, at a ratio of 1:1, and diluted to 31% per volume in Escaid 100 manufactured by Exxon) into the pond. The impeller was positioned at $\frac{1}{3}$ of the height of the organic measured from the base of the pond and agitation was initiated. The emulsions to be treated were then emptied into the pond while maintaining the continuity of phases in continuous organic and measured with a conductivimeter introduced into the mixture.

After a period of agitation, the system was allowed to rest. The solids removed from the primary emulsions, coalesced aqueous, secondary emulsions, and recovered organic were then purged through a lower valve. After all volumes were recorded, the remaining secondary emulsions were centrifuged at 3,000 rpm, equivalent to 2.5 G, from which an additional volume of organic was recovered. The volumetric composition of the primary emulsions, the secondary emulsions, and the centrifuge residue are set forth below:

| PHASE | VOLUMETRIC COMPOSITION OF EMULSIONS (% VOLUME) | | |
|---|---|---|---|
| | PRIMARY | SECONDARY | CENTRIFUGE RESIDUE |
| Organic | 74 | 37 | 15 |
| Aqueous | 18 | 38 | 52 |
| Solids | 8 | 25 | 33 |

The operational parameters and metallurgic results obtained were the following:

| | |
|---|---|
| Volume of the primary emulsions, ml | 1,000 |
| Volume of the operation organic, ml | 1,300 |
| Organic/emulsion ratio | 1.3 |
| Agitation time, min. | 45 |
| Tangential agitation velocity, feet/min. | 1,215 |
| Phase continuity in mechanical breaking | organic |
| Decanting time, hours | 6 |
| Organic recovery in mechanical breaking, % vol. | 83 |
| Centrifuging time, min. | 15 |
| Additional organic recovery, centrifuge, % vol. | 71 |

-continued

| | |
|---|---|
| Overall organic recovery, % vol. | 95 |

As one of the primary advantages of the present invention is the elimination of centrifuge equipment that has high investment and operating costs while maintaining similar rates of recovery, this test is considered to be referential in nature.

Test 1(b)

Mechanical Breaking of the Primary Emulsions and Subsequent Washing of the Secondary Emulsions by Mechanical Agitation In this test, the secondary emulsions generated in the mechanical breaking stage were emptied into a second pond having the same geometry and dimensions as the pond described above in connection with Test 1(a). The second pond was equipped with a shower in the upper part thereof through which a volume of refining solution was introduced from the extraction plant indicated in the previous test. The emulsion/solution mixture was moved slowly for a given time using a mechanical agitator similar to the one described above. Afterwards, the system was allowed to rest and as a result, emulsions with a significantly lower solid content were obtained. After the emulsions were separated and re-treated by the mechanical breaking method, it was effectively possible to recover a total fraction of organic similar to that recovered by the method described in Test 1(a).

The volumetric composition of the emulsions in the different stages of the process were as follows:

| VOLUMETRIC COMPOSITION OF THE EMULSIONS (% VOLUME) | | | | |
|---|---|---|---|---|
| PHASE | PRIMARY | SECONDARY | WASHING | RESIDUAL |
| Organic | 74 | 37 | 34 | 15 |
| Aqueous | 18 | 38 | 55 | 72 |
| Solids | 8 | 25 | 11 | 13 |

The operating parameters and the metallurgical results obtained were the following:

Mechanical breaking of the primary emulsions and washing of the secondary emulsions performed separately:

| | |
|---|---|
| Organic/emulsion ratio, washing | 1.3 |
| Agitation time, min. | 45 |
| Tangential agitation velocity, feet/min. | 1,216 |
| Phase continuity in mechanical breaking | organic |
| Decanting time, primary emulsions, hours | 6 |
| Decanting time, secondary emulsions, washing, hours | 15 |
| Washing of the secondary emulsions: | |
| Aqueous/emulsion ratio | 2.0 |
| Washing time, min. | 60 |
| Tangential agitation velocity, feet/min. | 386 |
| Decanting time, hours | 3 |
| Efficiency of solids removal, % vol. | 76 |
| Overall organic recovery, % vol. | 94 |

Test 1(c)

Washing of the Primary and Secondary Emulsions with Mechanical Agitation and Mechanical Breaking A test similar to test 1(b) was performed, however, this test also included a step in which the primary emulsions were washed before mechanical breaking. The operating methodology was the same as that described in the previous examples.

The volumetric composition of the emulsions in the different steps of the process were as follows:

| VOLUMETRIC COMPOSITION OF THE EMULSIONS (% VOLUME) | | | | | |
|---|---|---|---|---|---|
| PHASE | PRIMARY | SECONDARY | SECONDARY | RESIDUAL | WASHING |
| Organic | 75 | 82 | 41 | 41 | 22 |
| Aqueous | 19 | 17 | 58 | 58 | 77 |
| Solids | 6 | 1 | 1 | 1 | 1 |

The operating parameters and the metallurgical results obtained were the following:

| | |
|---|---|
| Washing conditions: | |
| Emulsion/aqueous ratio | 2.0 |
| Efficiency of removal of solids, primary emulsions % vol. | 78 |
| Efficiency of removal of solids, secondary emulsions % vol. | 34 |
| Organic loss, washing of primary emulsions, % vol. | 1.3 |
| Organic loss, washing of secondary emulsions, % vol | 0.5 |
| Washing time (primary and secondary), min. | 60 |
| Tangential agitation velocity, washings, feet/min. | 387 |
| Decanting time of washings, hours | 3 |
| Breaking conditions: | |
| Organic/emulsion ratio, washing | 1.3 |
| Agitation time, min. | 45 |
| Tangential agitation velocity, min. | 1,216 |
| Phase continuity | organic |
| Rest time, primary emulsions washing, hours | 6 |
| Rest time, secondary emulsions washing, hours | 15 |
| Overall Organic Recovery, % volume | 96 |

It can be seen from the test results that for this specific case, the use of mechanical breaking alone, (as set forth in Chilean Patent No. 30,817), recovers approximately 83% of the volume of the organic material from the emulsions. When complemented with a centrifuge, overall recoveries of 95% are achieved. In accordance with the present invention, washing the secondary emulsions and then applying mechanical breaking makes it possible to achieve a 94% recovery rate, which rises to 96% when the primary emulsions are also washed. Thus, it can be seen that the separation method of the present invention yields levels of recovery comparable to those achieved with mechanical breaking combined with centrifuging without the need for such cumbersome and expensive equipment.

EXAMPLE 2

Industrial Scale Tests of Mechanical Breaking

The tests were conducted in an extraction plant which processes 5,000 gallons per minute of a leeching solution of rubber and ore, generating an average of about 185 m³/month of emulsions. The emulsions are treated by mechanically breaking the primary emulsions and centrifuging the secondary emulsions. In the extraction plant, a hydroxy-oxymas mixture is used as the organic phase at a 1:1 ratio. This mixture is commercially available as Acorga PT-5050 manufactured by ICI and LIX 984 produced by Henkel Corp., diluted to 31% in volume in Escaid 100 from Exxon.

The tests performed in the industrial facilities themselves which include a first cylindrical emulsion reception pond of 42 m³ capacity having a diameter of 3.7 meters, and a second pond of similar capacity but equipped with a mechanical agitator that operates with a tangential velocity of 750 feet/min. In addition, the plant includes a pond for secondary emulsions, referred to as "back wash" with a capacity of 80 m³. The first or receiving pond includes a first valve at the base thereof and a second valve located at a height of 50 cm above the base, while the second or breaking pond includes a first valve at the base thereof and a second valve located at a height of 175 cm above the base. In addition, the facilities include a system of pumps that enable materials to be recirculated among the ponds.

In the facilities described above, the emulsions from the extraction plant are treated approximately every three days or as needed. The emulsions are extracted with a flexible hose activated by a pneumatic pump that enables the emulsions to be transported to the receiving pond. After a decanting period of approximately 24 hours, the separated aqueous solution is purged via a valve located at the base of receiving pond. The emulsions along with a small quantity of operating organic separated during the rest period, are emptied by a pneumatic pump into the mechanical breaking pond. The breaking pond has been previously fed with operating organic so that the volumetric ratio of organic to emulsion is 1:3 or higher.

Before the emulsions are emptied into the mechanical breaking pond, the system is agitated for a total time of about 1 hour at a velocity of 750 feet/min. The system is then allowed to decant for periods of 24 to 48 hours to purge the coalesced aqueous solution along with the solids separated from the emulsions which go to a collecting pond for dumping or drainage. The recovered organic is pumped to the last extraction stage (E2) of the extraction plant, where it is restored to the inventory of operating organic. The remaining or secondary emulsions which have a high solid content are sent to the back wash pond, where they are decanted for an additional period and periodically treated in an Alfa Laval centrifuge where an additional fraction of organic is recovered.

The average monthly results obtained in three months of operation with the above-described mechanical breaking process, excluding the centrifuge process, are presented in the following table:

| | VOLUMETRIC CCONCENTRATION OF EMULSION RECOVERY | | | |
|---|---|---|---|---|
| MONTH | COMPONENT | PRIMARY | SECONDARY | % VOL. |
| 1 | Organic | 76 | 47 | |
| | Aqueous | 21 | 48 | 81 |
| | solids | 3 | 5 | |
| 2 | Organic | 79 | 47 | |
| | Aqueous | 18 | 45 | 81 |
| | Solids | 3 | 8 | |
| 3 | Organic | 78 | 50 | |
| | Aqueous | 20 | 41 | 79 |
| | Solids | 2 | 9 | |

The overall recovery of organic during the three months indicated above was close to 95% when centrifuging was included.

EXAMPLE 3

Tests of Mechanical Breaking and Decompacting the Secondary Emulsions 14 m³ of primary emulsions were loaded with 6 m³ of secondary emulsions into the receiving pond. 20 m³ of an aqueous solution originating from the drainage pond was added, with the purpose of removing solids, and thus generating emulsions that would be easier to break. The washing solution was pumped to the upper part of the pond at a rate of 2 m³/min. Then, the aqueous solution containing solids in suspension that were originally in the emulsions was purged through the lower outlet of the pond. The operation continued for approximately 1 hour, at the end of which the aqueous solution turned a milky brown color, indicating that the coalescence band was near the outlet. The system was allowed to decant until the following day, a period of approximately 19 hours. A second purge of the aqueous solution and solids in suspension was then performed with the same operating criteria described above.

From the decompacted emulsions, a volume of 14 m³ was extracted through a side outlet located at a height of 50 cm above the base of the receiving pond and was pumped to the breaking pond. This pond had been previously charged with 18.9 m³ of operating organic and was agitated at 750 feet/min. to ensure that during the breaking process, the phase continuity would always be continuous organic. The charging operation with the emulsions lasted approximately 45 minutes and the system was agitated for 30 additional minutes. The agitation was then stopped and the system was allowed to rest for 20 hours. At the end of this rest period, the aqueous solution and solids in suspension were purged to a spill collecting conduit and sent to a drainage pond. The compacted secondary emulsions were then extracted through the lower outlet and pumped to the receiving pond in order to initiate a new washing cycle with the primary emulsions originating from the plant.

The following table shows the volumetric composition of the initial emulsions, the washed emulsions, and the secondary emulsions, wherein the composition values comprise 10 consecutive cycles.

| VOLUMETRIC COMPOSITION OF THE EMULSIONS, % VOLUME | | | |
|---|---|---|---|
| PHASE | HEAD | WASHED | SECONDARY |
| Organic | 68 | 62 | 24 |
| Aqueous | 27 | 35 | 66 |
| Solids | 5 | 3 | 6 |

The operating parameters and the metallurgical results obtained in the tests described were as follows:

| Washing the initial emulsions: | |
|---|---|
| Organic loss in the purging, % vol. | 4 |
| Efficiency in the removal of solids, % vol. | 35 |
| Emulsion/solution ratio, washing | 1 |
| Mechanical breaking of the washed emulsions: | |
| Organic/emulsion ratio | 1.4 |
| Agitation time, hours | 1.15 |
| Tangential agitation velocity, feet/min. | 750 |
| Decanting time, hours | 20 |
| Phase continuity | organic |
| Overall recovery of organic, % vol. | 93 |

The results of similar industrial tests, in which the secondary emulsions were extracted through a side outlet, instead of an outlet located at the base of the pond, are summarized in the following table:

| VOLUMETRIC COMPOSITION OF THE EMULSIONS | | | | | |
|---|---|---|---|---|---|
| TEST No. | COMPONENT | HEAD | WASHED | SECONDARY | RECOVERY % VOL. |
| 1 | Organic | 88 | 89 | 46 | |
|   | Aqueous | 8 | 8 | 37 | 96 |
|   | Solids | 5 | 4 | 17 | |
| 2 | Organic | 80 | 80 | 39 | |
|   | Aqueous | 14 | 16 | 49 | 95 |
|   | Solids | 6 | 4 | 12 | |
| 3 | Organic | 70 | 71 | 39 | |
|   | Aqueous | 24 | 25 | 58 | 95 |
|   | Solids | 6 | 4 | 9 | |

The operating parameters and the metallurgical results obtained in these last tests were as follows:

| Washing the head emulsions: | |
|---|---|
| Organic loss in the purging, % vol. | 1 |
| Efficiency in the removal of solids, % vol. | 34 |
| Emulsion/solution ratio, washing | 1 |
| Mechanical breaking of the washed emulsions: | |
| Organic/emulsion ratio | 1.4 |
| Agitation time, hours | 1.15 |
| Tangential agitation velocity, feet/min. | 750 |
| Decanting time, hours | 20 |
| Phase continuity | organic |
| Overall recovery of organic, % vol. | 95 |

As will be apparent to those skilled in the art, various modifications and adaptations of the embodiments described above will become readily apparent without departure from the spirit and scope of the invention, the scope of which is defined in the appended claims.

We claim:

1. A method for recovering organic material from emulsions produced during a solvent extraction process, comprising:

introducing a quantity of emulsions produced during a solvent extraction process into a first collecting pond, said emulsion comprising drops of organic material suspended in an aqueous matrix and a plurality of fine solid particles located at the interface between the organic material and the aqueous matrix;

adding to said emulsions in said first pond a quantity of an aqueous washing solution such that the ratio of the emulsions to the aqueous washing solution is between about 1:1 to 1:2, washing said emulsions with the aqueous washing solution;

purging said washed emulsions to remove between 25–75 percent by weight of the solids therefrom together with a portion of said aqueous washing solution;

transferring the washed emulsions into a second collecting pond;

breaking at least some of said emulsions by agitating said emulsions within said second pond with an organic liquid which is miscible with the organic phase of the emulsion and immiscible with the aqueous phase;

decanting said emulsions for a sufficient time to form at least three substantially separate layers within said second collecting pond, said layers comprising a first organic layer, a second layer of unbroken emulsions and a third layer comprising an aqueous phase with a quantity of solid particles in suspension therein, said particles containing a quantity of impregnated organic material; and removing said organic layer from said second pond.

2. The method of claim 1 which further comprises recycling said second layer of unbroken emulsions from said second collecting pond to said first collecting pond to permit further treatment thereof.

3. The method of claim 1 which further comprises preheating said aqueous washing solution to cause a reduction in density of said emulsions in the first collecting pond.

4. The method of claim 1 wherein said aqueous washing solution is applied to said emulsions in the first collecting pond by a process selected from the group consisting of spraying and showering said solution over the surface of said pond.

5. The method of claim 4 which further comprises adjusting the flow of said aqueous washing solution into said first collecting pond to between about 100 l/m and 2 m³/m.

6. The method of claim 1 which further comprises performing a second purge of the washed emulsions to adjust the aqueous content thereof to 30–50% by volume and the content of suspended solids therein to 1–5% by volume.

7. The method of claim 6 wherein said washed emulsion is permitted to stand for an interval of between 2 and 25 hours between said first and said second purges to permit phase separation during said interval.

8. The method of claim 1 which further comprises introducing air at a flow rate between about 1–40 liters per minute into said first collecting pond to agitate said emulsions and said aqueous washing solution to facilitate contact therebetween.

9. The method of claim 1 which further comprises facilitating contact between said emulsions and said aqueous washing solution by a process selected from the group consisting of vibration, agitation and recirculation.

10. The method of claim 1 wherein said emulsions are washed for between about 1–2 hours.

11. The method of claim 1 wherein said emulsions are agitated with said organic liquid in said second collecting pond by an impeller having a tangential velocity of between about 500–1,300 feet per minute.

12. The method of claim 11 wherein the agitation is carried out for between about 15–120 minutes.

13. The method of claim 1 wherein the emulsions are decanted for between about 15–24 hours after agitation with said organic liquid to permit formation of said three separate layers.

14. A method for recovering organic material from emulsions produced during a solvent extraction process, said method comprising:

introducing a quantity of emulsions produced during a solvent extraction process into a first collecting pond, said emulsions comprising drops of organic material suspended in an aqueous matrix and a plurality of fine solid particles located at the interface between the organic material and the aqueous matrix;

adding an aqueous washing solution to said emulsions in said first pond by spraying or showering said aqueous washing solution onto the surface of said pond in an amount such that the ratio of the emulsions to the aqueous washing solution is between about 1:1 and 1:2;

washing said emulsions with said aqueous washing solution for between about 1–2 hours;

subjecting said washed emulsions to a first purge to remove between about 25–75 percent by weight of solids therefrom, together with a portion of said aqueous washing solution;

permitting the washed emulsion to stand for an interval of between about 2 and 25 hours to permit phase separation therein;

performing a second purge of said emulsions to adjust the aqueous content thereof to between about 30–50% by volume and the content of suspended solids to between about 1–5% by volume;

transferring the emulsions from said first collecting pond into a second collecting pond wherein said emulsions are mechanically agitated with an organic liquid which is miscible with the organic phase of the emulsion and immiscible with the aqueous phase thereof;

breaking at least some of said emulsions by agitating said emulsions and said organic liquid;

decanting the contents of said second collecting pond for between about 15–24 hours to form at least three substantially separate layers therein, said layers comprising a first organic layer, a second unbroken emulsion layer and a third aqueous phase layer, said third layer further including a quantity of organic solid particles in suspension therein, said particles containing a quantity of impregnated organic; and removing said organic layer from said second collection pond.

15. The method of claim 14 which further comprises recycling said unbroken emulsions from said second collecting pond to said first collecting pond.

16. The method of claim 14 which further comprises returning said organic layer to an extraction plant after removal from said second collecting pool.

17. The method of claim 16 which further comprises washing said organic layer with an aqueous solution to reduce its solids content prior to returning said layer to an extraction plant.

18. The method of claim 14 which further comprises purging said aqueous phase layer from said second collection pond.

19. The method of claim 18 wherein said purged aqueous phase layer is washed with a solvent to recover the impregnated organic from said solid particles.

20. The method of claim 14 which further comprises washing a second batch of said emulsions in said first collecting pond during agitation of said washed and purged emulsions in said second collecting pond.

21. The method of claim 14 wherein said emulsions are agitated with said organic liquid in said second pond by an impeller having a tangential velocity between about 500–1,300 feet per minute.

22. The method of claim 21 wherein said agitation is carried out for between about 15–120 minutes.

23. The method of claim 14 which further comprises storing said washed emulsions in a third collection pond prior to mechanically agitating said emulsions in said second collection pond.

* * * * *